United States Patent [19]

Sakamoto

[11] Patent Number: 4,629,430
[45] Date of Patent: Dec. 16, 1986

[54] PLANT OPERATOR TRAINING SIMULATOR

[75] Inventor: Fumio Sakamoto, Hyogo, Japan

[73] Assignee: Mitsubishi Denki Kabushiki Kaisha, Tokyo, Japan

[21] Appl. No.: 689,224

[22] Filed: Jan. 7, 1985

[30] Foreign Application Priority Data

May 23, 1984 [JP] Japan ............................... 59-104230

[51] Int. Cl.⁴ ............................................ G09B 25/02
[52] U.S. Cl. ..................................... 434/219; 434/366
[58] Field of Search ....................... 434/218, 219, 366

[56] References Cited

U.S. PATENT DOCUMENTS 3,421,232  1/1969  Sherman ............................. 434/366

Primary Examiner—Harland S. Skogquist
Attorney, Agent, or Firm—Bernard, Rothwell & Brown

[57] ABSTRACT

A computer controlled training simulator for a thermal power plant includes a switching device for selecting interactive or independent operation of a boiler simulation section, a turbine simulation section and a generator simulator section. In the interactive mode, the boiler, turbine and generator sections operate as corresponding sections of a single power plant for training operators of the respective sections. In the independent mode, the individual sections are operated as the corresponding sections of three separate power plants so that training of operators of each section can proceed without delays associated with functions of the other two sections.

2 Claims, 4 Drawing Figures

FIG. 3
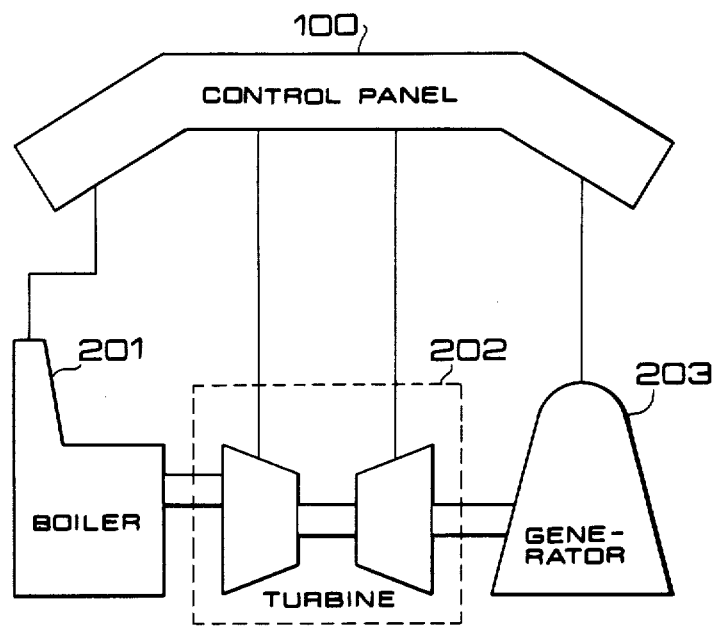
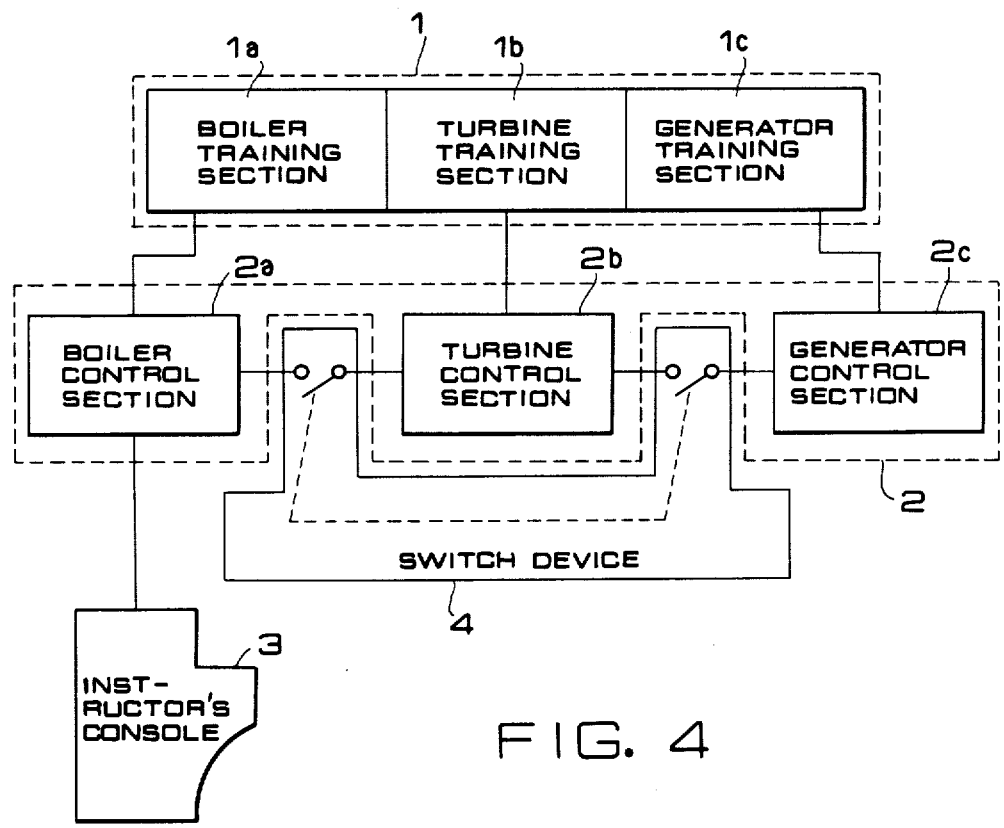
FIG. 4

PLANT OPERATOR TRAINING SIMULATOR

BACKGROUND OF THE INVENTION

1. Technological Field of the Invention

The present invention relates to a training simulator for training operators of an industrial plant in which a physical process goes on continuously.

2. Description of the Prior Art

The conventional training simulator for training operators of the thermal power plant shown in FIG. 1 will first be described. The simulator is made up of a training equipment 1 through which simulated operating devices of the plant are manipulated, a computer 2 which processes the signals sent from the training equipment, calculates the process of the plant using several mathematical models, and displays the state of the process on the training equipment, and an instructor's console 3 which dictates the training equipment 1 and computer 2. This training simulator for thermal power plant operators simulates the actual process and control operation of the plant, and therefore the major equipment and process of the actual thermal power plant will first be described with reference to FIG. 3. The thermal power plant is essentially made up of a boiler 201, a turbine 202 and a generator 203, and the process of the plant is controlled on the control panel 100. In the plant, thermal energy is produced in the boiler 201 by the combustion of fuel so as to heat water and vapor which are the carriers of heat. The heated vapor is fed to the turbine 202, in which thermal energy is converted into kinetic energy. Then, the kinetic energy produced by the turbine 202 is converted into electrical energy by the generator 203.

The thermal power plant with a continuous process of energy conversion as mentioned above involves various physical values generated and controlled in each section of the facility. For example, the boiler 201 involves the quantity of fuel and air, and the temperature, pressure and flowrate of vapor as control parameters for the efficient generation of thermal energy, and the turbine 202 involves the temperature, pressure and flowrate of vapor that vary from time to time during the conversion of thermal energy possessed by the vapor into kinetic energy. The generator 203 involves the rotational speed and other physical values related to the generation of electrical energy. All of these physical values are converted into corresponding electrical signals through proper transducers (not shown), and displayed by the lamps and instruments on the control panel 100, through which operators of the power plant are informed of the state of the process. The operators judge the state of power generating process from the displayed information and intervene in the process by operating the switches and handles on the control panel 100 so as to maintain the power generating condition at the optimum condition.

Accordingly, the job of operators in the thermal power plant ranges extensively, and the operators are required to take action against any state of process based on accurate and prompt decision. The purpose of the training simulator is to train operators of the thermal power plant in advance, so that they can operate the actual plant properly and effectively. On this account, the training simulator has the training equipment 1 as shown in FIG. 2 constructed similarly to the control panel 100 of FIG. 3, so that the trainees feel as if they are operating the actual thermal power plant.

The thermal power generating process is performed analogically by the computer 2, and the signals representing the various physical values in the process which vary continuously are delivered to the training equipment 1. The trainees observe the state of simulated process through the display on the training equipment 1 and are required to take a proper action which matches the process state. Generally, the training is conducted for a team of operators consisting of boiler operators, turbine operators and generator operators, as in the case of the actual thermal power plant. However, the situation of operating the thermal power plant does not permit all team members to equally acquire the skill. For example, it takes about 15 hours after the thermal power plant has made a cold start-up until it provides a 100% power output, and most of the time is spent for the rise of the temperatures and pressures in the boiler 21. After the turbine 22 has been started, much time is spent for turbine heat soak before the generator 23 is ready for training, and the generator operators have a lot of idle time.

In order to save the simulator from such low efficiency of training, there has been used a training simulator capable of setting initial conditions. This simulator has a record of physical values at several phases of the thermal power plant so that the process can be started at any phase of the process. This arrangement allows the setup of process to the desired phase of training, e.g., the state of 100% output, by skipping lengthy start-up phases, thereby rendering the training for all team members without wasting time. However, this method cannot completely eliminate the long cold start-up period in which only the trainees of boiler can be trained, but the trainees of turbine and generator are kept waiting until the initial phases are over.

Another conventional training simulator is provided with a so-called fast-motion function which speeds up the power generation process. This function allows, for example, the reduction of the 15-hour cold start-up period by a desired factor, and the total time of training can be cut down. However, even by this method, all trainees of boiler, turbine and generator cannot be trained simultaneously, so the method is not the essential solution against the idle time of trainees.

As mentioned above, the conventional training simulator cannot solve the problem of idle time in training, resulting in a low-efficiency training for plant operators.

SUMMARY OF THE INVENTION

The training simulator according to the present invention comprises an instructor's console which generates signals representing an arbitrary state of process set up by the instructor, a computer which performs computation of simulation in response to the signals produced on the instructor's console, a training equipment which is connected to the computer and operates to display the state of various plant devices as a result of simulation by the computer and to vary the state of process performed by the computer in response to the action taken by trainee(s), and a switching device which functionally divides or links the computer sections in correspondence to each plant device. In case the training equipment and computer are each divided into three sections, for example, trainees of these sections can be trained concurrently, whereby idle time in training can be eliminated.

BRIEF DESCRIPTION OF THE DRAWINGS

FIG. 3 is a block diagram showing the thermoelectric power generation system to be simulated by the simulator; and FIG. 4 is a block diagram showing the plant operator training simulator according to the present invention.

DETAILED DESCRIPTION OF THE PREFERRED EMBODIMENTS

Figure 1:
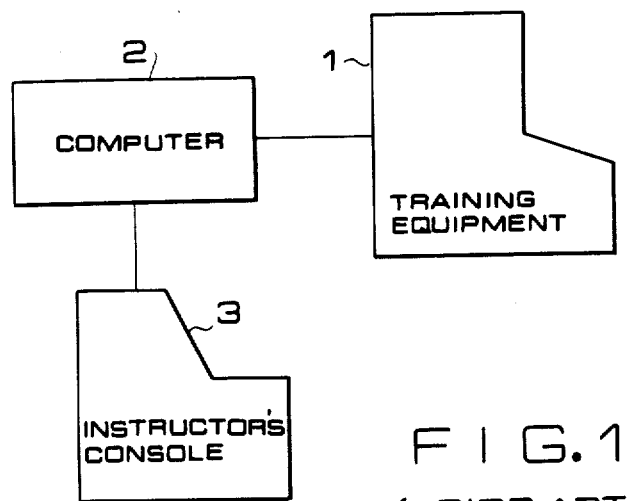
FIG. 1 is a block diagram showing the conventional plant operator training simulator.
Figure 2:
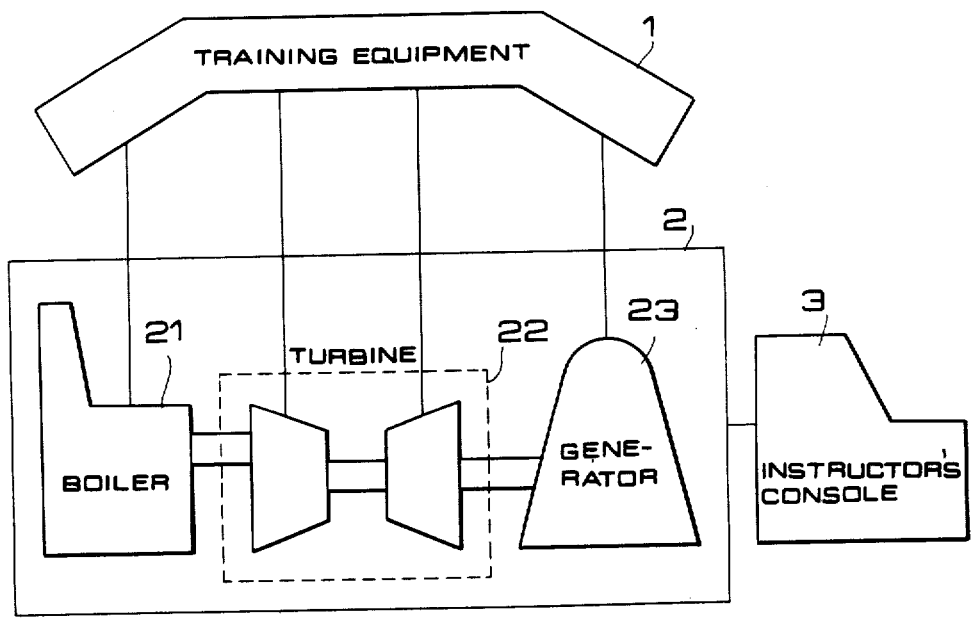
FIG. 2 is a block diagram showing in more detail the simulator shown in FIG. 1.

The present invention will now be described with reference to FIG. 4. Reference number 1 denotes a training equipment simulating the control panel of the plant, e.g., the control panel 100 shown in FIG. 3, and it consists in combination of a boiler training section 1a, a turbine training section 1b and a generator training section 1c. Reference number 2 denotes a computer consisting of three control sections 2a, 2b and 2c connected to the training sections 1a, 1b and 1c, respectively, of the training equipment 1. A switch device 4 is provided so that the linkage between the control sections 2a and 2b, and the linkage between the control sections 2b and 2c can be connected or disconnected arbitrarily. Reference number 3 denotes a trainer's console of the conventional type, and explanation thereof will be omitted.

Next, the operation of the above-mentioned arrangement will be described. The simulator of this embodiment functions most effectively when the switch device 4 is set to disconnect the linkage between each control section. In this operating mode, the training sections 1a, 1b and 1c are given states of process by the control sections 2a, 2b and 2c, and operate independently of each other. The physical values are varied separately for each training section as if three independent power plants are operated in response to respective training sections only which can be accessed for monitoring and operation by the trainees of the respective sections. This method allows the independent and concurrent training for the trainees of boiler, turbine and generator.

Other functions indispensable for the training simulator include freeze/run, snapshot, and initial value setting. Freeze/run is a function to halt and restart the process, snapshot is a function to establish an arbitrary state in the controller so that the training can be started from that point at any time, and initial value setting is a function to set up instantaneously the operational state of the plant when initiating the training. These functions are provided independently for the three training sections.

When the switch device 4 is set to the linkage mode by the command issued from the instructor's console, the three control sections 2a, 2b and 2c operate in unison to control the training sections 2a, 2b and 2c in exactly the same manner as in the conventional training simulator. Needless to say, the functions for training the whole personnel as a team, as has always be done in the conventional training simulator, must not be underestimated.

The training simulator for plant operators may alternatively be arranged as a system made up of several stand-alone simulators each performing a divisional part of the total plant functions, and the same effects as of the foregoing embodiment are achieved.

Although in the above embodiment a single trainer's console 3 is used, it is also possible to provide a trainer's console independently for each of the training sections 1a, 1b and 1c.

Although the invention has been described for the embodiment of the training simulator for training the thermal power plant operators, it is also applicable to the training simulator for the nuclear power plant operators or for the operators of other plants, and the same effects as of the above embodiment can be expected.

Effect of the Invention

According to the present invention, as described above, the control section of the simulator is arranged separably through the switch device, whereby the efficiency of training can be improved without sacrificing the conventional training functions.

What is claimed is:

1. An operator training simulator for training operators of a thermal power plant, comprising:

a trainer's console producing signals in correspondence to an arbitrary state of process of a thermal power plant as set up by a trainer;

a computer including a boiler control section, a turbine control section and a generator control section all for performing predetermined computation of simulation of operation of respective power plant sections in response to the signals produced on said trainer's console;

a training equipment including a boiler training section, a turbine training section and a generator training section connected to the respective control sections of said computer and adapted to display the state of a respective boiler plant section, a turbine plant section and a generator plant section obtained as a result of computation by said computer, said equipment being capable of varying the state of process by sending operating signals produced in correspondence to actions taken by trainees back to said computer; and a switch device having (1) a disconnecting mode for functionally dividing the boiler control section, the turbine control section and the generator control section of said computer so that the control sections concurrently operate independently of each other as if three independent power plants are operated in response to the respective training sections, and also having (2) a connecting mode for linking the boiler control section, the turbine control section and the generator control section of said computer so that the control sections operate interactively as if a single unitary power plant is operated in response to the training sections.

2. An operator training simulator according to claim 1, wherein said trainer's console is made up of three sections in correspondence to said boiler control section, turbine control section and generator control section of said computer.

* * * * *